United States Patent Office 2,777,375
Patented Jan. 15, 1957

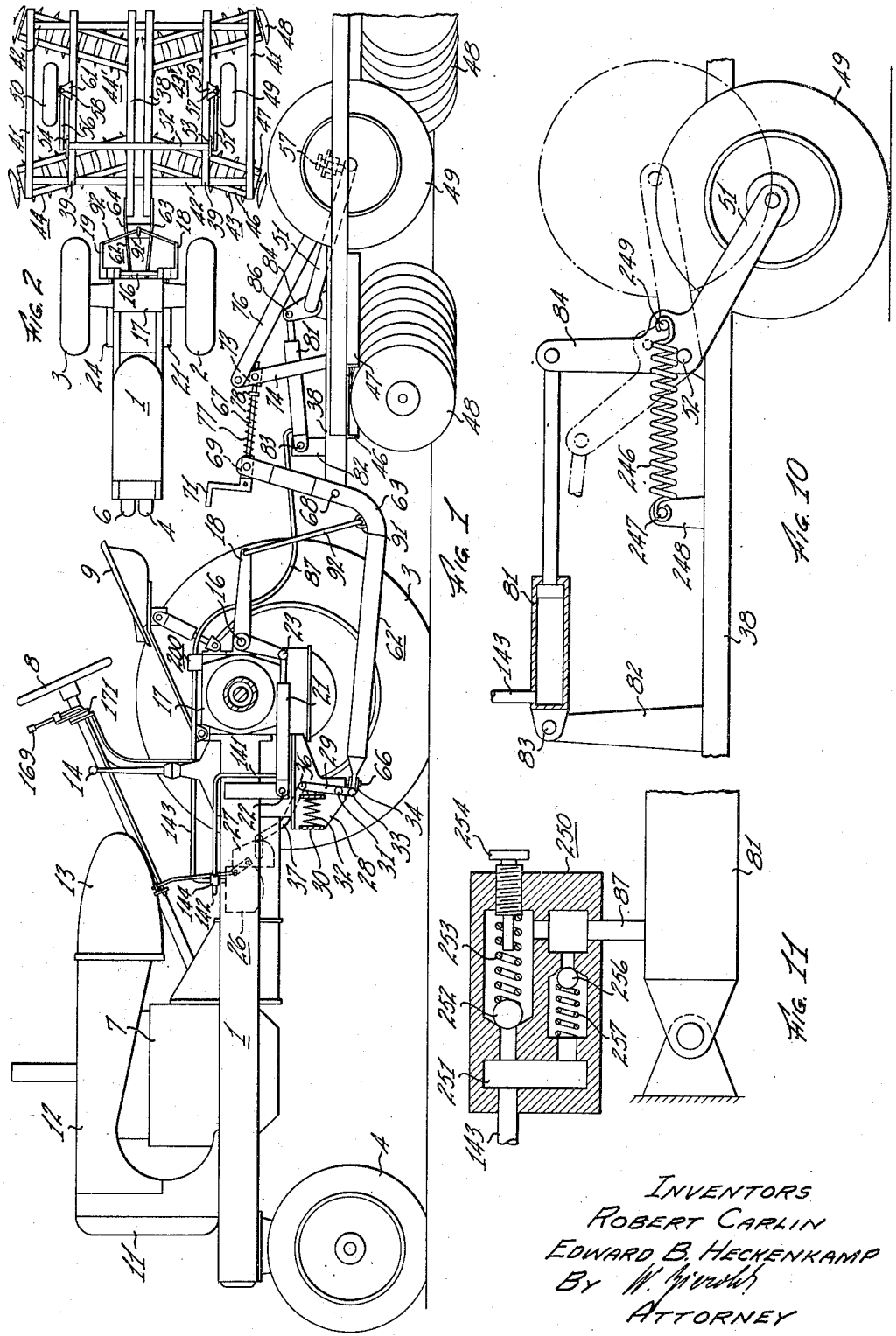

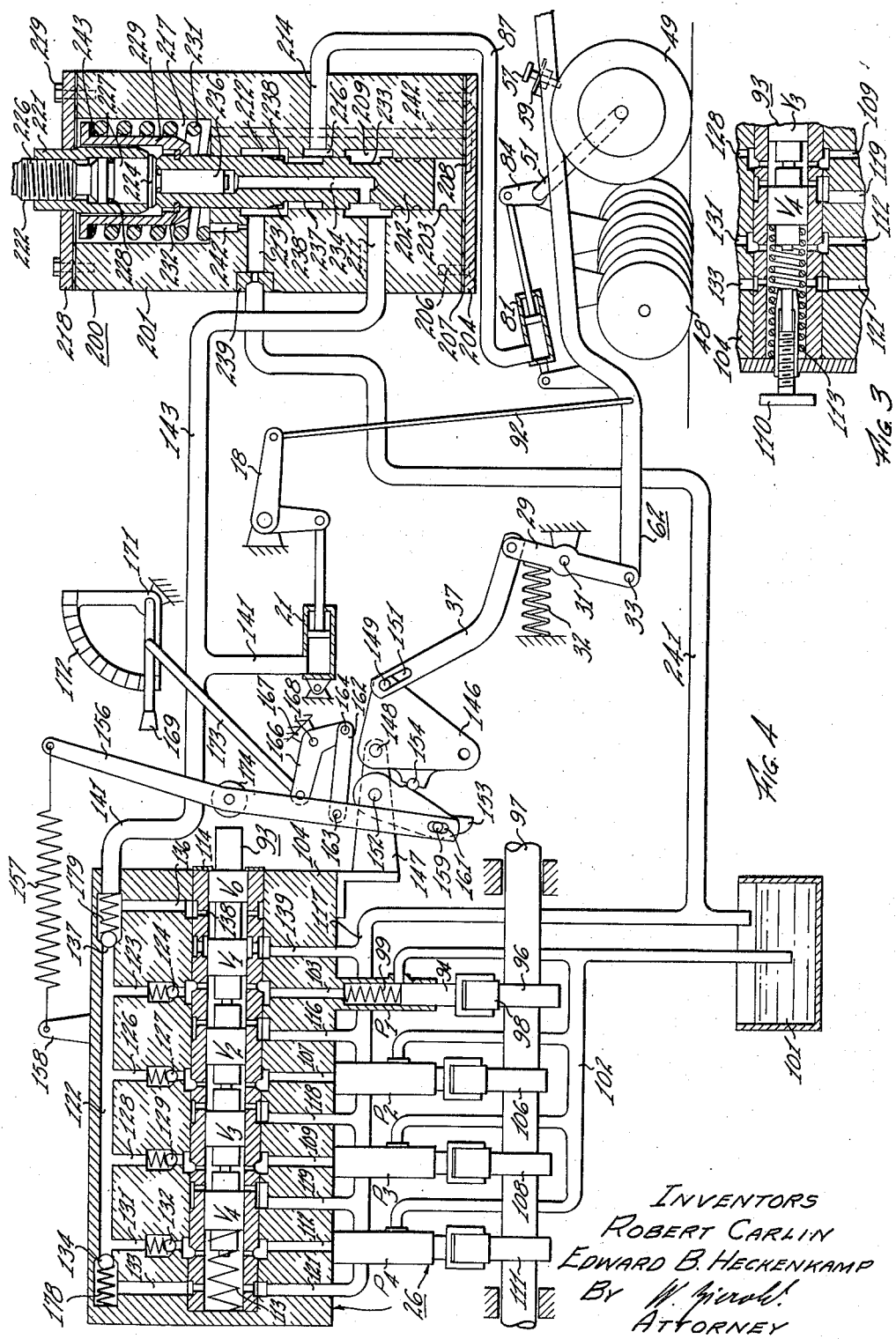

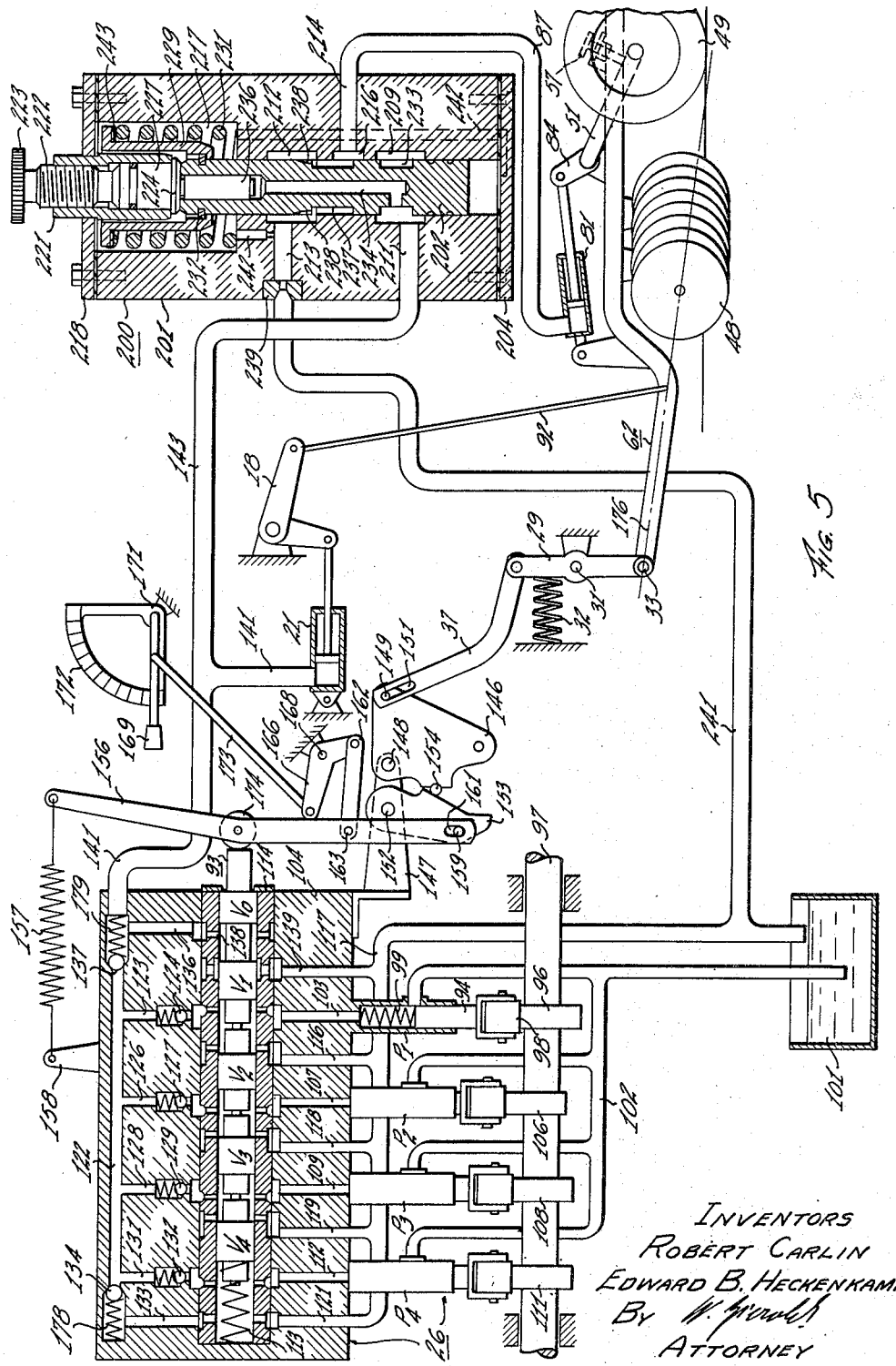

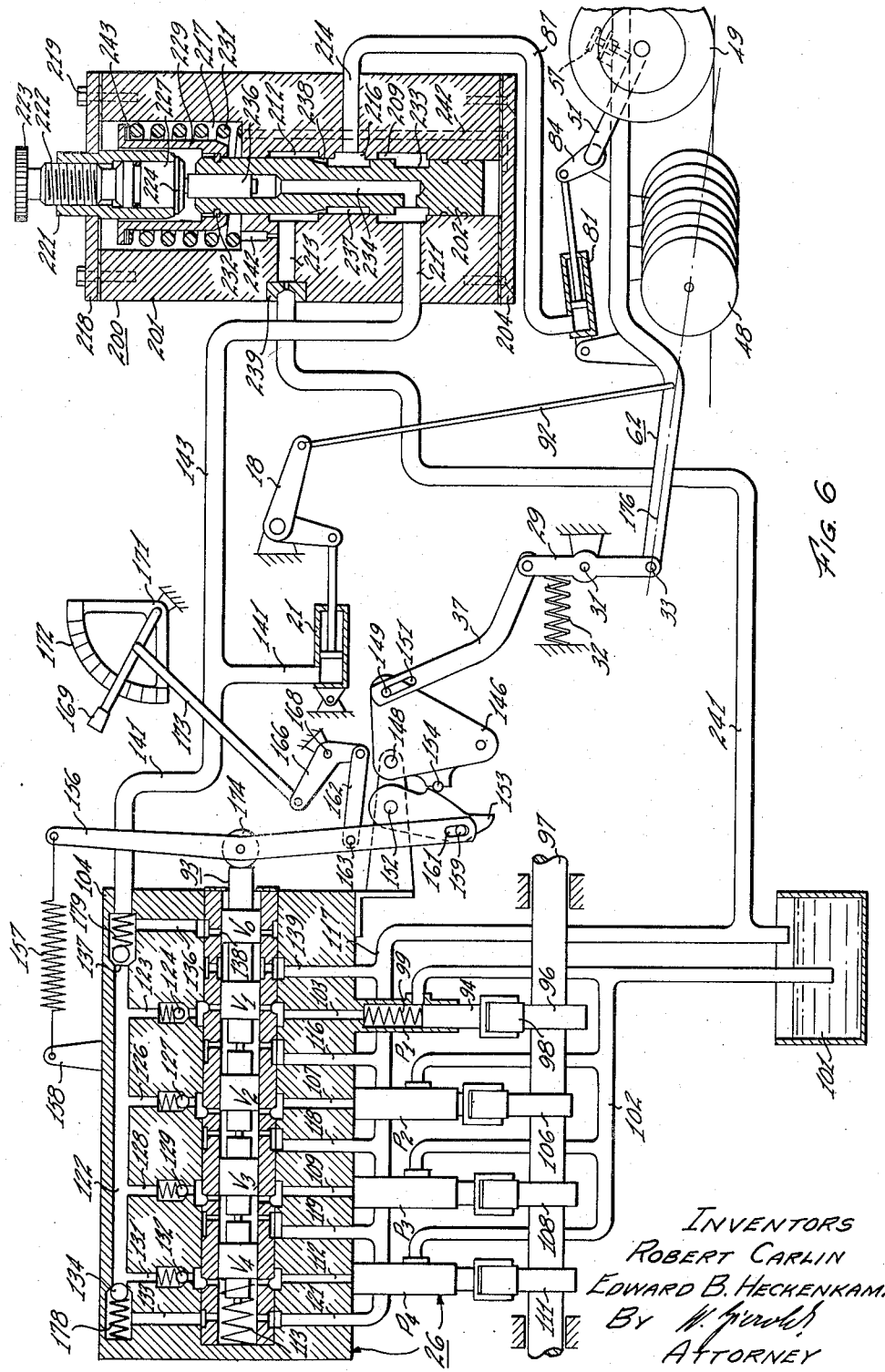

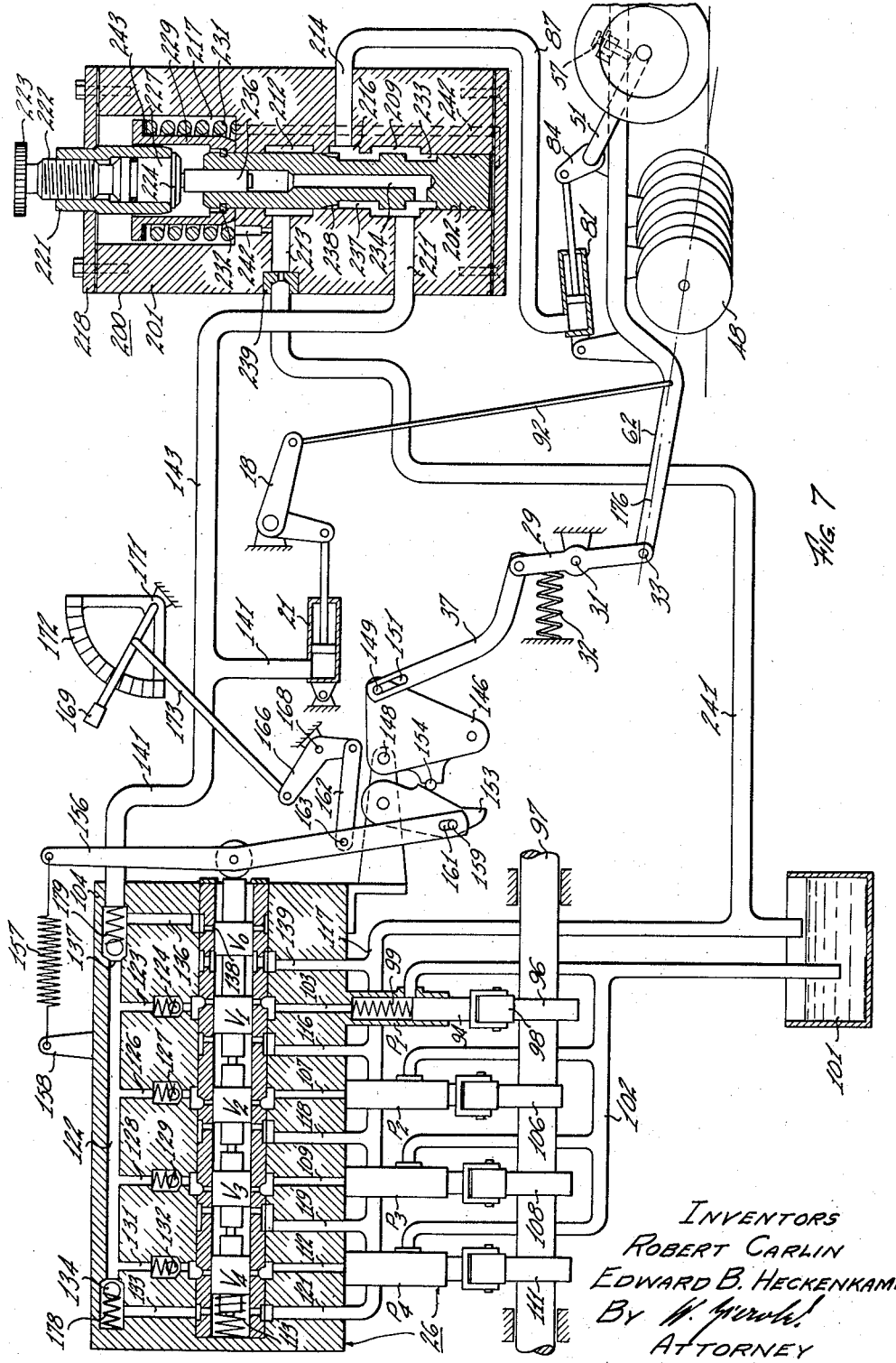

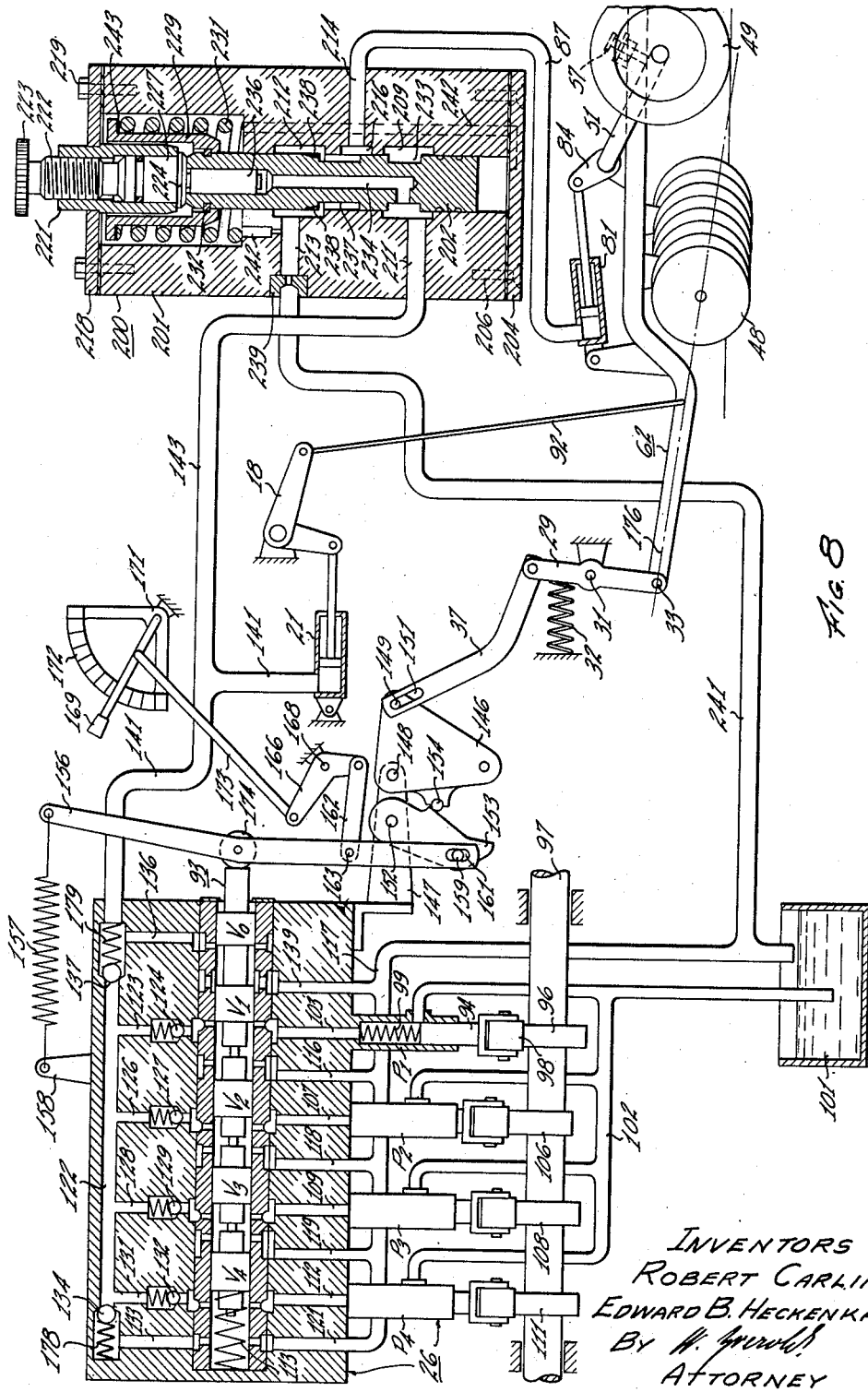

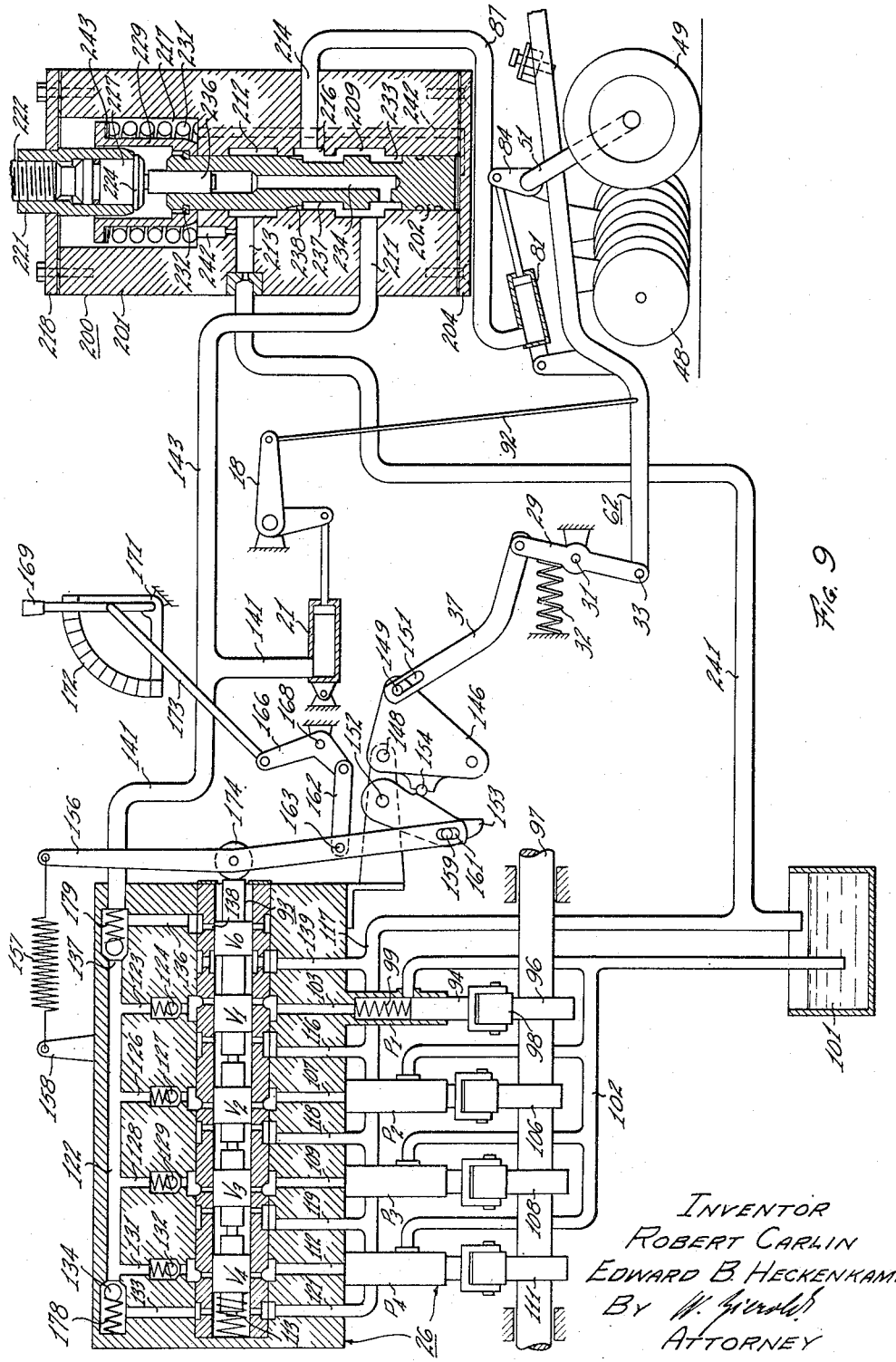

2,777,375

TRACTION BOOSTING POWER LIFT SYSTEM

Robert Carlin and Edward B. Heckenkamp, Milwaukee, Wis., assignors to Allis-Chalmers Manufacturing Company, Milwaukee, Wis.

Application July 11, 1955, Serial No. 521,126

10 Claims. (Cl. 97—46.07)

This invention relates to tractors, and it is concerned more particularly with an improved tractor operated power lift system.

Various types of tractor operated power lift systems have heretofore been suggested which function not only to raise and lower an agricultural implement or other load connected with the tractor, but which also perform certain control functions in response to variations of the pull or propelling force developed by the tractor. For instance, in order to operate a tractor and a drawn load which is hitched to the tractor for advancement by the latter, power lift systems have heretofore been suggested which subject the load, while it is being advanced by the tractor, to a moderate lifting force which is insufficient to actually raise the load from a downwardly to an upwardly adjusted position, and which lifting force automatically increases and decreases as the resistance against propulsion of the drawn load becomes greater or smaller.

One purpose which has heretofore been accomplished by a draft responsive power lift system of the hereinabove outlined character is to transfer weight from the drawn load and from the steerable front wheels, which are located forwardly of the tractor drive wheels, to said drive wheels, with the result that traction boosting additional weight is imposed upon the tractor drive wheels when such additional weight is desirable or necessary in order to keep the tractor moving under heavy draft conditions. When the heavy draft condition subsides the system functions automatically to progressively remove the additional weight from the tractor rear wheels and restore it to the drawn load and to the tractor front wheels.

Another purpose which has heretofore been accomplished by a draft responsive power lift system of the hereinabove outlined character is to maintain the depth of soil penetration of a pickup type earth working tool substantially uniform under varying conditions of soil resistance, and to decrease the working depth of the tool only when the draft required to advance the implement becomes excessive.

During the past, draft responsive traction boosting power lift systems of the hereinabove outlined character have been used extensively in connection with agricultural implements such as plows, harrows and the like, which are light enough so that they can be picked up by a lift mechanism on the tractor and carried entirely on the latter during transport without causing an objectionably large transfer of weight from the tractor front wheels to the tractor rear wheels. If too much weight were transferred from the front wheels to the rear wheels of the tractor, the tractor would no longer respond properly to steering movement of its front wheels, and an excessive lifting effort may result in rearing of the tractor upwardly on its rear wheels, as is well known in the art. Such earlier traction boosting power lift systems, therefore, have not been suitable for use with relatively light but powerful tractors and with implements or other loads which are sufficiently large to take full advantage of the horsepower capacity of the tractor engine but too heavy for handling in the same manner in which relatively light pickup type implements have heretofore been handled by traction boosting power lift systems of conventional construction.

One of the difficulties in handling relatively large and heavy implements or other loads by a powerful but relatively light tractor and an associated traction boosting power lift system is the lack of weight to counteract the tendency of the tractor front end to swing upward when additional weight is imposed upon the tractor drive wheels for traction boosting purposes. Another difficulty is presented by the hazard of the relatively heavy weight of the drawn load which would instantly swing the tractor upwardly on its drive wheels if the full power of the lift mechanism were suddenly applied to the drawn load in an attempt to boost the downward load on the tractor rear wheels or to pick up the drawn load for transport purposes. If the drawn load consists of an implement having tools which must be lifted above the ground for transport purposes, the conventional expedient of raising the entire implement and carry it in a suspended, rearwardly overhanging condition on the tractor would not be available.

Generally, it is an object of the present invention to provide an improved traction boosting power lift system which overcomes the hereinabove outlined difficulties in properly and safely handling a relatively heavy drawn load by a powerful but relatively light tractor.

More specifically, it is an object of the invention to provide an improved traction boosting power lift system which automatically functions to keep the lifting force which is applied to the drawn load for traction boosting and transport purposes at a sufficiently low value so as to prevent undue loss of steering response of the tractor front wheels and rearing of the tractor upwardly on its drive wheels by operation of the power lift mechanism.

Another object of the present invention is to provide an improved traction boosting power lift system of the hereinabove outlined character wherein a draft load imposing structure is hitched to the tractor on a vertically fixed pivot center and which will operate to apply lifting force to the draft load imposing structure at points which are spaced from said pivot center and from each other in the direction of travel; a tractor mounted lift mechanism being provided to apply lifting force to the drawn load at one of these points, and an up and down adjustable ground engaging running gear element being provided to apply lifting force to the drawn load at the other of said points.

A still further object of the invention is to provide a traction boosting power lift system which will operate automatically in response to variations of the tractor draft load to apply more or less lifting force to a drawn load by means of a tractor mounted lift mechanism, and also to apply lifting force to the drawn load by means of an up and down movable ground engaging running gear element, the system being so arranged that application of lifting force by operation of the up and down movable running gear element will be delayed until a lifting force of predetermined value has been applied to the drawn load by operation of the tractor mounted lift mechanism.

A still further object of the invention is to provide a traction boosting power lift system of the hereinabove outlined character, which incorporates a pair of hydraulically operated servomotors and a control mechanism therefor which causes sequential operation of said servomotors so that one will operate only after the other has operated to apply a lifting force of predetermined magnitude to the drawn implement or other draft load imposing structure.

The foregoing and other objects and advantages are attained by the present invention, various novel features of which will be apparent from the description herein and the accompanying drawings disclosing several embodiments of the invention, and will be more particularly pointed out in the appended claims.

Referring to the drawings:

Fig. 1 is a side view of a tractor and of a semitrail type disk harrow hitched to the tractor, the near rear wheel of the tractor being omitted for purposes of exposure and the rear part of the harrow carrying rear gangs of disks being likewise omitted;

Fig. 2 is a top view, at a reduced scale, of the tractor and disk harrow shown in Fig. 1;

Fig. 3 is a sectional view, on an enlarged scale, of an adjustable stop which may be incorporated in the hydraulic mechanism shown in Figs. 4 to 9;

Figs. 4 to 9, inclusive, are diagrammatic views of a traction boosting power lift system incorporated in the tractor and harrow combination shown in Figs. 1 and 2;

Fig. 10 is a detail view, partly in section and on an enlarged scale, of a modified ram arrangement for the disk harrow shown in Figs. 1 and 2; and Fig. 11 is a detail view, partly in section, of a modified form of a delayed action valve incorporated in the power lift system shown in Figs. 1 to 9.

The tractor shown in Fig. 1 is of generally conventional construction in that it comprises a main body generally designated by the reference character 1, a pair of widely spaced rear traction wheels 2 and 3 (Fig. 2) and a pair of narrowly spaced front wheels 4 and 6.

An internal combustion engine 7 at a forward portion of the tractor furnishes power for driving the rear traction wheels 2 and 3, and a clutch, change speed transmission, differential gearing and final drive gears are provided in conformity with established practice to transmit power from the engine to the tractor drive wheels. The front wheels 4 and 6 are steerably mounted at the front end of the tractor main body 1 in conventional manner and a steering wheel 8 in front of an operator's seat 9, serves to adjust the front wheels 4 and 6 for steering purposes as desired. A radiator unit 11, hood 12, fuel tank 13 and gear shift lever 14 are arranged in their usual locations on the tractor main body.

The tractor shown in Figs. 1 and 2 is equipped with a power lift mechanism of a type which has heretofore been used in connection with farm tractors, and the details of which are disclosed, for instance, in U. S. Patent 2,679,199, granted May 25, 1954, to W. F. Strehlow for Power Lift Means Affording Depth Regulation of Tractor Propelled Implements. Briefly, the power lift mechanism comprises a rock shaft 16 which is mounted on the rear axle housing 17 of the tractor for rotation on a horizontal, transversely extending axis and which is equipped at its opposite ends with bell crank levers 18 and 19, each having a relatively long rearwardly extending arm for connection in lift force transmitting relation with an implement at the rear of the tractor, and a relatively short downwardly extending arm for connection with a hydraulic ram. The actuating ram for the bell crank lever 18 is designated by the reference character 21 (Figs. 1 and 2) and is mounted at its barrel end on the tractor main body 1 by means of a pivot pin 22. The plunger end of the ram 21 is pivotally connected with the depending arm of the bell crank lever 18 by means of a pivot pin 23. The actuating ram for the bell crank lever 19 is generally indicated in Fig. 2 by the reference character 24 and the explanations hereinbefore with respect to the mounting of the ram 21 on the tractor and its connection with the bell crank 18 similarly apply to the mounting of the ram 24 on the tractor and its connection with the bell crank 19.

The rams 21 and 24 are connected with a pressure fluid supply system which will be explained more fully hereinbelow in connections with Figs. 4 through 9, and which includes a pump and valve unit generally designated by the reference character 26, and a control mechanism, part of which is enclosed in a housing 27 attached to the pump and valve unit 26.

A hitch mechanism for connecting a draft load imposing structure in drawn relation with the tractor is arranged at the underside of the tractor main body 1 in proximity to and forwardly of the rear axle housing 17, as best shown in Fig. 1. The hitch mechanism comprises a bracket 28 which is rigidly secured to the tractor main body; a rockable hitch lever 29 which is pivotally mounted on the bracket 28 by means of a pivot pin 31 for back and forth swinging movement on a horizontal transverse axis in vertically fixed relation to the tractor main body; and a strong coil spring 32 which is operatively interposed between the hitch lever 29 and an abutment 30 on the bracket 28 to yieldingly resist forward swinging movement of the lever 29 about the pivot pin 31. Fig. 1 shows the hitch lever 29 in a generally vertical, slightly rearwardly inclined position, and the lower end of the lever 29, below the pivot pin 31, is suitably constructed for pivotal connection with a coupling member 34. Preferably, the lower end of the hitch lever 29 is bifurcated and has a pair of transversely aligned coupling pin receiving apertures, so that the coupling element 34 may be straddled by the forked lower end of the hitch lever 29 and connected thereto for up and down swinging movement about a vertically fixed pivot center by insertion of a horizontal coupling pin 33 through the aligned apertures of the hitch lever 29 and a registering aperture in the coupling element 34. Pivotally connected to the upper end of the rockable hitch lever 29 by means of a pivot pin 36 is a reach link 37 which extends forwardly and upwardly from the hitch lever 29 and is operatively connected at its upper forward end with an element of the control mechanism enclosed in the housing 27 as will be more fully explained hereinbelow with reference to Figs. 4 through 9.

The disk harrow, as shown in Figs. 1 and 2, is of generally conventional construction in that it comprises a rigid assembly of longitudinally extending central frame members 38, a pair of transversely spaced longitudinally extending side frame members 39 and 41 at one side of the central frame members 38, a corresponding pair of longitudinally extending frame members 39 and 41 at the other side of the central frame members 38, and a plurality of transverse cross members 42.

Fig. 2 shows a disk gang 43 at the forward left hand part of the frame assembly 38, 39, 41, 42, and another disk gang 44 at the forward right hand part of the frame assembly. An additional pair of left and right disk assemblies 43' and 44' are mounted on the rear part of the frame assembly in conventional manner. The disk gang 43 comprises a pair of parallel frame bars 46 and 47 which are rigidly secured to the longitudinal frame bars 38, 39, 41 so as to extend horizontally outward from the central frame bars 38 in a forwardly inclined position, and a series of axially aligned dished disks 48 are rotatably mounted below the frame bars 46 and 47 in conventional manner. These explanations as to the mounting of the disks 48 of the gang 43 generally apply to the mounting of the disks of the gangs 44 and of the rear gangs, 43' and 44'. Gangs 43 and 44 are positioned in forwardly diverging relation to each other, and the disks of each gang are so mounted that their convex sides face toward the center of the harrow. The rear gangs 43' and 44' are mounted in forwardly converging relation to each other and the disks of the rear gangs are positioned so that their concave sides face toward the center of the harrow. In these respects the harrow conforms with well known principles of construction.

In order to provide for travel of a disk harrow in nonworking condition provisions are sometimes made to deangle the disk gangs, that is, to adjust the gangs for rotation of the disks on axes at right angles to the direction of travel. The harrow shown in Figs. 1 and 2 is not of the type which is transported on its disks but is equipped with a pair of running gear elements in the form of supporting wheels 49 and 50 which may be raised and lowered relative to the frame assembly 38, 39, 41, 42, the supporting wheel 49 being located at the left side of the harrow, and the supporting wheel 50 being located at the right side of the harrow. The supporting wheel 49 is rotatably mounted on the free end of a supporting arm 51 which is fixedly secured to a transversely extending rock shaft 52 in right angle relation to the latter. The rock shaft 52 is journaled at its opposite ends in bracket plates 53 and 54 secured to the longitudinally extending frame bars 39, and a support arm 56 corresponding to the supporting arm 51 is secured to the right hand end of the rock shaft 52 for mounting the supporting wheel 50.

Suitable provisions are made for limiting upward swinging movement of the wheel supporting arms 51 and 56 relative to the frame assembly 38, 39, 41 and 42. While such provisions may be made in various forms it is desirable that they afford an adjustable limit stop as diagrammatically indicated in Figs. 1 and 2. In these figures a pair of set screws 57 and 58 are mounted in overlying relation to the supporting arms 51 and 56, respectively, by brackets 59 and 61 rigidly secured to the longitudinal frame bars 39 at the right and left sides, respectively, of the harrow. In the condition of the harrow, as shown in Fig. 1, the supporting arm 51 bears upwardly against the lower end of the set screw 57 and the supporting arm 56 at the other side of the harrow similarly bears against the lower end of the set screw 58. Downward adjustment of the set screw 57 from the position in which it is shown in Fig. 1, and corresponding downward adjustment of the set screw 58, will decrease the cutting depth of the harrow. Conversely, in order to increase the cutting depth of the harrow, the set screws 57 and 58 may be adjusted upwardly relative to the frame assembly.

Attachment of the harrow to the coupling member 34 on the tractor is accomplished by means of a draft structure generally designated by the reference character 62. As shown in Fig. 2, opposite side members 63 and 64 of the draft structure 62 converge forwardly and extend under the rear axle of the tractor for connection with the coupling element 34. Suitable provisions are made for connecting the draft structure 62 at its forward end to the coupling member 34 on the tractor in horizontally swingable relation to the latter. For that purpose an eye may be formed on the forward end of the draft structure 62 for engagement with a rearwardly extending portion of the coupling element 34, and a coupling pin 66 (Fig. 1) may be inserted through a vertical hole in the coupling element 34 and into the eye at the forward end of the draft structure 62.

At the rear end of the draft structure 62 the side members 63 and 64 extend upwardly in generally parallel relation to each other and then converge toward each other to form a support for an adjusting screw 67. The central frame members 38 of the harrow extend forwardly into the space between the side members of the draft structure 62 and a transverse pivot pin 68 extends through the side members 63 and 64 of the draft structure 62 and through the adjacent forward portions of the central frame members 38 so as to connect the draft structure and the entire frame assembly 38, 39, 41, 42 for relative angling movement about the axis of the pivot pin 68. The adjusting screw 67 extends through a swivel block 69 in axially slidable relation to the latter. Rigidly secured to the forward end of the adjusting screw 67 is a crank 71 for turning the adjusting screw in the swivel block 69. The swivel block 69 is straddled by the bifurcated upper rear end of the draft structure 62 and has opposite trunnions rotatably supporting the swivel block 69 for movement relative to the draft structure 62 on a transverse axis. A threaded portion of the adjusting screw 67 is operatively engaged with an internally threaded swivel block 73. A pair of upstanding bracket plates 74 are secured at their lower ends to the frame member 38 and converge upwardly so as to straddle the swivel block 73, the latter being journaled on the bracket plates 74 for rocking movement on a transverse axis in a manner similar to that explained hereinbefore in connection with the swivel block 69. The bracket plates 74 are braced by a pair of struts 76 which are secured to the upper ends of the bracket plates 74 above the swivel block 73 and extend downwardly and rearwardly therefrom into overlapping engagement with the central frame members 38 to which they are rigidly secured in any suitable manner. A strong coil spring 77 surrounds the adjusting screw 67 in rear of the swivel block 69 and reacts between the latter and a nut 78 in cooperative engagement with the threaded portion of the adjusting screw 67. The nut 78 is drawn up so as to place the coil spring 77 under appreciable compression.

The purpose of the adjusting screw 67 is to angularly adjust the frame assembly 38, 39, 41 and 42 relative to the draft structure 62 and to permit yielding upward movement of the frame assembly 38, 39, 41 and 42 relative to the draft structure 62 under certain operating conditions. When the crank 71 is rotated in one direction the distance between the swivel blocks 69 and 73 will be shortened and as a result the rear end of the frame assembly will be raised relative to the draft structure 62 about the pivot pin 68. Similarly, when the crank 71 is rotated in the opposite direction the rear end of the frame assembly will be lowered about the pivot pin 68. The spring 77, as stated hereinbefore, is under appreciable compression and will normally resist upward swinging movement of the frame assembly about the pivot pin 68. Downward swinging movement of the frame assembly about the pivot pin 68 will be positively prevented in any adjusted position of the screw 67 by axial engagement of the crank 71 with the swivel block 69. If the harrow is advanced in cutting position, which will be explained more fully hereinbelow, the front gangs may drop into a depression and in that case the spring 77 will yield and permit the front disks to remain in contact with the ground.

The adjusting screw 67 may also be manipulated to vertically adjust the forward end of the draft structure 62 while the harrow rests on its disks, the purpose of such adjustment being to bring the hitch eye at the forward end of the draft structure 62 into vertical registry with the coupling element 34 on the tractor preparatory to establishment of the hitch connection by means of the coupling pin 66.

For purposes of the present invention the feature of angular adjustment the harrow frame assembly 38, 39, 41 and 42 relative to the draft structure 62 about the pivot pin 68 is significant in that downward swinging movement of the frame assembly 38, 39, 41, 42 about the pivot pin 68 is positively prevented by axial engagement of the crank 71 with the swivel block 69.

In order to adjust the harrow supporting wheels 49 and 50 from the implement lowered position in which the wheel 49 is shown in Fig. 1 to an implement raised position as indicated in Fig. 9, a hydraulic ram 81 is mounted on the central frame members 38 and operatively connected with the rock shaft 52. As shown in Fig. 1, the barrel end of the ram 81 is pivotally secured to an upstanding bracket 82 by means of a pivot pin 83, and the plunger end of the ram 82 is connected to a radial arm 84 of the rock shaft 52 by means of a pivot pin 86. As will be described more fully hereinbelow, fluid pressure may be admitted to the ram 81 by means of a conduit 87 so as to extend the ram and thereby force the harrow supporting wheels downwardly with the result that the frame assembly 38, 39, 41, 42 and the draft structure 62 will swing upwardly about the vertically fixed pivot center 33 on the tractor and the disks will be raised out of engagement with the ground as indicated in Fig. 9. In order to lower the disks, pressure fluid may be emitted from the rams 21, 24 and 81, as will be explained more fully hereinbelow.

In order to provide for the hereinbefore mentioned lift connection between the rearwardly extending arms of the bell crank levers 18 and 19 and the disk harrow, loop 91 is formed on the draft structure at a portion of the latter in rearwardly spaced relation to the vertically fixed pivot center at 33. A chain or cable 92 is passed through the loop 91, and the chain or cable 92 is anchored at one end on the rearwardly extending arm of the bell crank lever 18, and at the other end on the rearwardly extending arm of the bell crank lever 19. The length of the chain or cable 92 is such that in the position of the parts, as shown in Fig. 1, the cable will be substantially taut. As pointed out hereinbefore, the harrow is hitched to the tractor not only for vertical up and down swinging movement about the pivot center 33, but also for horizontal swinging movement about the vertical pivot pin 66 (Fig. 1). The chain or cable 92 affords a horizontally swingable lift connection between the bell crank levers 18 and 19 and the disk harrow. In operation, the tractor will pull the harrow through the hitch connection at 33 and 34, and when the tractor is driven to the right or left, the draft structure 62 will swing from the position in which it is shown in Fig. 2, either toward the rear wheel 2 or the rear wheel 3 about the pivot pin 66, depending on the direction in which the turn is made.

The bell crank levers 18 and 19 may become subject to lifting force at any time during operation of the harrow, as will be explained more fully hereinbelow, and if the tractor is steered to the right or left while the chain or cable 92 is kept under tension by operation of the rams 21 and 24, the loop 91 may slide along the tensioned chain or cable in order to accommodate relative horizontal angular displacement of the tractor and harrow about the vertical coupling pin 66.

Referring to Fig. 4, the pump and valve unit 26 which has been mentioned hereinbefore comprises four reciprocable plunger pumps $P_1$, $P_2$, $P_3$, and $P_4$, and an axially reciprocable valve spool 93 having lands $V_1$, $V_2$, $V_3$, and $V_4$ for controlling the discharge of the pumps $P_1$, $P_2$, $P_3$ and $P_4$, respectively. The pump $P_1$ has a plunger 94 which is reciprocated back and fourth by an eccentric 96 on a rotary shaft 97, the eccentric 96 bearing against a roller 98 at the lower end of the plunger 94 and a coil spring 99 being mounted in the cylinder of the pump $P_1$ to urge the plunger 94 toward the shaft 97 and thereby maintain the roller 98 in engagement with the eccentric 96. The shaft 97 forms part of the power transmitting mechanism between the engine 7 and the tractor rear wheels 2 and 3, and the arrangement is such that the shaft 97 rotates when the engine 7 is running and the master clutch of the tractor is engaged. The pump $P_1$ draws liquid, preferably oil, from a sump 101 through a branch of an inlet manifold 102 and discharges it into a passage 103 of the housing 104 for the valve spool 93. The usual check valves, not shown, are associated with the intake and outlet ports of the pump $P_1$ so that operation of the latter will continuously feed oil into the passage 103.

The foregoing explanation with respect to the pump $P_1$ similarly applies to each of the pumps $P_2$, $P_3$ and $P_4$. That is, the pump $P_2$ is operated by an eccentric 106 on shaft 97 and feeds oil into a passage 107; the pump $P_3$ is operated by an eccentric 108 on shaft 97 and feeds oil into a passage 109, and the pump $P_4$ is operated by an eccentric 111 on shaft 97 and feeds oil into a passage 112.

The valve spool 93 is axially slidable back and forth in the housing 104, and a coil spring 113 at the left end of the valve spool 93 reacts between the housing 104 and the valve spool 93 so as to urge the latter toward the limit position in which it is shown in Fig. 4 and which is determined by axial engagement of a land $V_0$ of the valve spool with an end stop 114.

A manually adjustable stop screw 110 may be mounted in the housing 104 opposite to the left end of the valve spool 93, as shown in Fig. 3, for the purpose of adjusting the stroke of the valve spool 93, that is, the extent to which the valve spool 93 may move to the left from the position in which it is shown in Fig. 4. Fig. 3 shows the stop screw 110 in an adjusted position which permits movement of the valve spool 93 from its extreme right hand limit position in which it is shown in Fig. 4, to its other extreme left hand limit position in which it is shown in Fig. 9. Progressive adjustment of the stop screw 110 from the position in which it is shown in Fig. 3 toward the right of said figure first disables the pump $P_4$, and then the pumps $P_3$, $P_2$ and $P_1$ in the order named, from feeding pressure fluid to the rams 21, 24 and 81, as will be discussed more fully hereinbelow.

In the position of the valve spool, as shown in Fig. 4, the oil delivered by pump $P_1$ into the passage 103 passes from the latter through the space between the lands $V_1$ and $V_2$ into a branch 116 of the outlet manifold 117 and is returned by the latter to the sump 101. Similarly, the oil delivered by the pump $P_2$ into the passage 107 passes from the latter through the space between the lands $V_2$ and $V_3$ of the valve spool 93 into a branch 118 of the outlet manifold 117 and is returned by the latter to the sump 101. The oil delivered by the pump $P_3$ into the passage 109 passes from the latter through the space between the lands $V_3$ and $V_4$ of the valve spool 93 into a branch 119 of the outlet manifold 117 and is returned by the latter to the sump 101. The oil delivered by the pump $P_4$ into the passage 112 passes from the latter through the space between the land $V_4$ and the left end wall of the valve housing 104 into a branch 121 of the outlet manifold 117 and is returned by the latter to the sump 101.

A pressure manifold 122, shown in the upper part of the valve housing 104 in each of Figs. 4 through 9, has a first branch 123 which is controlled by a check valve 124 and communicates, opposite to the passage 103, with the valve chamber enclosing the valve spool 93. A second branch 126 of the pressure manifold 122 is controlled by a check valve 127 and communicates, opposite to the passage 107, with the valve chamber enclosing the valve spool 93. A third branch 128 of the pressure manifold 122 is controlled by a check valve 129 and communicates, opposite to the passage 109, with the valve chamber enclosing the valve spool 93. A fourth branch 131 of the pressure manifold 122 is controlled by a check valve 132 and communicates, opposite the passage 112, with the valve chamber enclosing the valve spool 93. A relief passage 133, which connects the left end of the chamber for valve spool 93 with the pressure manifold 122, is controlled by a check valve 134 which, as will be explained hereinbelow, serves as an unloading valve.

An internal passage 136 of the valve housing 104 at the upper right hand end of the latter, as shown in Fig. 4, has a check valve controlled port 137 in communication with the pressure manifold 122 and communicates with the right hand end of the chamber for the valve spool 93 through a port 138 which, as will be explained hereinbelow, is controlled by the land $V_0$. In the position of the valve spool 93, as shown in Fig. 4, the space between the lands $V_0$ and $V_1$ is in open communication with a branch 139 of the outlet manifold 117, but when the valve spool is shifted toward the left, as shown in Figs. 6, 8 and 9, the port 138 is closed by land $V_0$.

A conduit 141 connects the internal passage 136 of the valve housing 104 with the ram 21, as indicated diagrammatically in Fig. 4, and as shown more clearly in Figs. 1 and 2. The other ram 24 of the tractor is also connected with the internal passage 136, and a suitable connecting conduit 142 is indicated in Fig. 1. However, the tractor mounted ram 24 is not shown in the diagrammatic view of Fig. 4 because the rams 21 and 24 are in effect connected in parallel relation with each other, and for practical purposes, act as a single fluid motor.

A distributor valve generally designated by the reference character 200, and more fully described hereinbelow in connection with Figs. 4 to 9, is connected with the internal passage 136 of the valve housing 104 in parallel with the rams 21 and 24, and this is schematically indicated in Fig. 4 by a conduit 143 which leads from the valve 200 into the conduit 141. In Fig. 1 the conduit 143 is shown as being connected to a fitting 144 on the tractor which serves to establish communication between the internal passage 136 (Fig. 4) of the valve housing 104 with the conduit 143 and with the conduits 141 and 142.

Referring to Fig. 4, the distributor valve 200 comprises a stationary valve housing 201 and an axially movable valve spool 202. The spool 202 is reciprocably fitted into a cylindrical bore 203 of the housing 201, the bore 203 being covered at one end by an end cover 204 secured to the valve housing 201 by an annular series of screws 206. A gasket 207, which has a cutout 208 for a purpose to be described later, is interposed between the end cover 204 and the valve housing 201. The bore 203 is radially enlarged by an annular groove 209 which communicates with an inlet passage 211; and another annular groove 212, which forms another radial enlargement of the bore 203, communicates with a relief passage 213. A discharge passage 214 has a port 216 in communication with the bore 203 intermediate the annular grooves 209 and 212.

The bore 203 of the valve housing 201 merges with an axially extending, radially enlarged recesses 217, and a head plate 218 is secured to the valve housing 201, by means of cap screws 219, in covering relation to the recess 217. Rigidly secured to the head plate 218, as by welding, is a mounting sleeve 221 for a thumb screw 222, which has a knurled knob 223 (Fig. 5) outside of the valve housing 201 and a disk head 224 within the recess 217. An externally threaded shank portion 226 of the thumb screw 222 has screw threaded engagement with an internally threaded portion of the sleeve 221, and the screw 222 is guided for axial back and forth movement relative to the sleeve 221 by means of a radially enlarged cylindrical section 227 which has a running fit within a smooth counterbore of the sleeve 221. A packing 228 within a circumferential groove of the cylindrical section 227 seals the recess 217 against egress of pressure fluid past the thumb screw 222.

Within the recess 217 of the valve housing 201 the sleeve 221 is surrounded by a thimble 229 which extends axially over an adjacent end portion of the valve spool 202. A relatively strong coil spring 231 bears against the bottom of the recess 217 and reacts against a radially outward extending flange of the thimble 229 so as to urge the latter toward the head plate 218. A snap ring 232 within the thimble 229 is seated in an annular groove of the valve spool 202 and locks the latter to the thimble 229 for movement in unison therewith toward the head plate 218 under the pressure of the spring 231.

In condition of the distributor valve, as shown in Fig. 4, the thumb screw 222 is adjusted to its outward limit position in which the disk head 224 engages the axially inner end of the sleeve 221. In this condition of the valve the spring 231 is effective to urge the valve spool 202 axially against the disk head 224.

The valve spool 202 has a circumferential groove 233 which is of sufficient axial length so as to register with the groove 209 of the valve body 201 in all axially adjusted positions of the valve spool 202, as illustrated by Figs. 4, 6 and 7. The circumferential groove 233 of the valve spool communicates with a blind axial bore 234 of the spool 202, and a reciprocable plunger 236 is closely fitted into a radially enlarged portion of the axial bore 234 opposite to the disk head 224 of the thumb screw 222. Another circumferential groove 237 is formed in axially spaced relation to the groove 233, the position and width of the groove 237 axially of the spool 202 being such that it will place the port 216 of the discharge passage 214 in open communication with the groove 212, and through the latter with the relief passage 213, when the valve is in the ram relieving position in which it is shown in Figs. 4, 5, and 8. The location of the groove 237 on the valve spool 202 and its axial width are further such that movement of the valve spool 202 to its ram actuating condition, in which it is shown in Figs. 7 and 9, will establish communication between the groove 209 and the discharge passage 214, and interrupt communication between the discharge passage 214 and the relief passage 213. In order to effect a gradual transition from the operating condition in which the distributor valve 200 is shown in Figs. 7 and 9 to the condition shown in Fig. 4, a pair of radial, diametrically opposed saw cuts 238 are formed in the edge of the groove 237 which faces the adjacent edge of the groove 212. Further, in order to cushion the descent of the harrow from the transport position in which it is shown in Fig. 9 to the rest position in which it is shown in Fig. 4, a restrictor 239 is placed into the relief passage 213. A return passage, schematically indicated by the reference character 241 places the outwardly facing side of the restrictor 239 into communication with the sump 101. A vent passage 242 in the valve housing 201 comprises two sections, one of which is connected with the bore 203 through the hereinbefore mentioned cutout 208 of the gasket 207 and communicates with the recess 217 of the valve housing 201. The recess 217 in turn communicates with the relief passage 213 through the other section of the vent passage 242.

The hitch lever 29 is shown in Fig. 4 in a more rearwardly tilted positioned than in Fig. 1, and the spring 32 is shown in a correspondingly expanded condition in which it yieldingly resists forward swinging movement of the lever 29 about the pivot center 31. The upper end of the lever 29 is pivotally connected with the reach link 37, and the statement has been made hereinbefore that the reach link 37 is operatively connected at its upper forward end with an element of the control mechanism enclosed in the housing 27. The mentioned control mechanism is diagrammatically indicated in Fig. 4 and comprises a generally triangular rocker 146 which is pivotally supported on a stationary bracket 147 by means of a pivot pin 148. The rocker 146 carries a stud 149 which projects into a slot 151 of the reach link 37. The stud 149 and slot 151 from a lost motion connection between the reach link 37 and the triangular rocker 146, and in the condition of the mechanism as shown in Fig. 4, the stud 149 is engaged by the upper end of the slot 151 so that the rocker will be prevented from anticlockwise movement, as viewed in Fig. 4 about the pivot pin 148 as long as the hitch lever 29 is in the indicated rearwardly inclined position.

Pivotally mounted on the bracket 147 by means of a pivot pin 152 is a secondary rocker 153 which bears at one side against a lug 154 on the triangular rocker 146. The secondary rocker 153 is biased anticlockwise, as viewed in Fig. 4, into engagement with the lug 154 by means of a floating lever 156 and a coil spring 157 which is operatively interposed between the upper end of the floating lever 156 and a bracket portion 158 of the valve housing 104 so as to urge the upper end of the floating lever 156 toward the left in Fig. 4.

The floating lever 156 has a pin and slot connection at its lower end with the secondary rocker 153, a pin 159 being secured to the secondary rocker 153 and extending through a slot 161 in the lower end of the floating lever 156. A hand operated mechanism for moving the floating lever 156 back and forth about its connection with the secondary rocker 153 comprises a link 162 which is pivotally connected at one end to the lever 156 by means of a pivot pin 163 and at its other end by means of a pivot pin 164 to a bell crank lever 166. The bell crank lever 166 is pivotally supported at its fulcrum on a stationary bracket 167 by means of a pivot pin 168 and adjustment of the bell crank lever about the pivot pin 168 may be effected by means of a hand lever 169 shown in the upper part of Fig. 4 and also in proximity to the steering wheel 8 in Fig. 1. The hand lever 169 is pivotally mounted on a suitable support 171 mounted on the steering column of the tractor, the support 171 including quadrant 172 along which the hand lever 169 may be moved to the various positions in which it is shown in Figs. 4 through 9. A suitable detent mechanism, not shown, is provided for releasably retaining the hand lever 169 in any position of adjustment along the quadrant 172. Pivotal movement of the hand lever 169 about its pivot center on the bracket 171 is transmitted to the bell crank lever 166 by means of suitable linkage diagrammatically represented in Fig. 4 by the link 173. Upward adjustment of the hand lever 169 from the position in which it is shown in Fig. 4 causes clockwise movement of bell crank lever 166 about its pivot center 168, and corresponding anticlockwise movement of floating lever 156 about pivot pin 159 on secondary rocker 153. The floating lever 156 is arranged in such relation to the reciprocable valve spool 93 that the latter may be moved to the left in opposition to the action of the spring 113 by movement of the floating lever 156 toward the left from the position in which it is shown in Fig. 4, the lever 156 having a suitable contact boss 174 for cooperative engagement with the right end face of the valve spool 93.

The herein disclosed power lift system is operable to accomplish two principal functions, namely, first, to adjust the harrow selectively to a transport position which is diagrammatically indicated in Fig. 9 and to a working position such as indicated in Figs. 5, 6, 7 and 8; and second, to transfer weight from the harrow to the rear wheels of the tractor when such weight transfer becomes desirable in order to keep the tractor moving under severe operating conditions. The principal advantage of the system resides in the fact that it provides for handling of a relatively large and heavy implement by a powerful tractor whose weight to horsepower ratio is relatively small. For example, the tractor may have an engine which is capable of developing 45 H. P. but the operating weight of the tractor may only be about 4700 pounds. Assuming that the general overall construction of the tractor conforms with accepted practice, the normal load carried by the rear wheels 2 and 3 would be about seventy percent of the total tractor weight, that is, about 3300 pounds, and the normal load carried by the front wheels 4 and 6 of the tractor would be about thirty percent of the total tractor weight or about 1400 pounds. On the other hand, the harrow may be assumed to have a total weight of about 1900 pounds and a total of about forty disks of 16 inches' diameter each. That is, the harrow would be of a size to take full advantage of the available horsepower of the tractor, but offer such high resistance to propulsion at a desirable cutting depth that the normal vertical load on the tractor rear wheels of about seventy percent of the total tractor weight would be inadequate to afford the necessary grip of the tractor drive wheels for advancing the harrow not only under normal soil conditions, but also under unfavorable soil conditions as may be encountered, for instance, after a rain when the ground is slippery and considerable power is required to move the disks through the soil.

Another problem presented by the assumed circumstances is the fact that the harrow weight is much too great for carrying the harrow entirely on the tractor during transport, that is, in the manner in which pickup type implements of relatively light weight have heretofore been transported. If the hydraulic servomotor 81 were omitted and an attempt were made to lift the harrow solely by operation of the tractor mounted rams 21 and 24, the front end of the tractor would swing up about the axis of the rear wheels 2 and 3 before the heavy weight of the harrow would be picked up by the power lift cranks 18 and 19. Obviously, the inability of the tractor to raise the harrow for transport purposes without undue loss of front wheel loading and consequent loss of steering response would be very objectionable from a practical standpoint, and the tendency of the tractor to turn over rearward would present a serious hazard for the operator.

The provision of the herein disclosed power lift system avoids all of the mentioned difficulties, that is, it insures adequate grip of the tractor drive wheels to utilize the full power of the engine for propulsion purposes; it permits adjustment of the harrow to a transport position as shown in Fig. 9 without subjecting the tractor front end to an undesirably high lifting force; and it eliminates the hazard presented by the tractor swinging up rearwardly about the axis of the tractor rear wheels.

Considering first the operating condition of the system illustrated by Fig. 4, it will be noted that the hand lever 169 is adjusted to its extreme downward or implement lowering position and that the disks of the harrow rest on the ground but have not yet entered the ground to any appreciable cutting depth. This is a condition which will usually be obtained when the tractor and attached harrow are driven to the field and the control lever 169 is moved all the way down while the tractor is standing still. In this condition the tractor develops no drawbar pull and, accordingly, the spring 32 will keep the hitch lever 29 in the rearwardly inclined position in which it is shown in Fig. 4. The control spring 157 for the floating lever 156 will tend to swing this lever anticlockwise about the pivot center 163 and as a result the pin and slot connection between the lower end of the floating lever 156 and the secondary rocker 153 will bias the secondary rocker 153 anticlockwise about the pivot 152 and into engagement with the lug 154 on the triangular rocker 146. The resulting anticlockwise bias on the triangular rocker 146 urges the stud 149 against the upper end of the slot 151 but with relatively light pressure which is ineffective to cause any appreciable forward swinging movement of the hitch lever 29 about its pivot center 31 against the action of the heavy coil spring 32.

In the adjusted position of the floating lever 156, as shown in Fig. 4, the contact boss 174 on the floating lever is spaced an appreciable distance from the right end of the valve spool 93. The lands $V_0$, $V_1$, $V_2$, $V_3$ and $V_4$ are so arranged that in the position of the spool 93, as shown in Fig. 4, the oil discharge from the pumps $P_1$, $P_2$, $P_3$ and $P_4$ will return to the sump 101 as has been explained hereinbefore without setting up any pressure in the pressure manifold 122 and the port 138 is uncovered by the land $V_0$ so that any oil which may be pushed out of the rams 21, 24 during the lowering of the harrow from its transport position (Fig. 9) to its rest position (Fig. 4) may freely return to sump through the conduit 141, internal passage 136 and branch 139 of outlet manifold 117. Likewise, any oil pushed out of the ram 81 during the lowering of the harrow from its transport position (Fig. 9) to its rest position (Fig. 4) may freely return to sump through the conduit 87, annular grooves 216, 237, 212 of distributor valve 200 and return conduit 241.

Fig. 5 shows the main valve spool 93 in the same position as that in which it is shown in Fig. 4, and the hand lever 169 is also shown in the same position in which it is shown in Fig. 4. However, the disk harrow is shown in a working position in which the disks are lowered to a substantial cutting depth and which is determined, as explained hereinbefore by the setting of the adjusting screws 57 and 58. The condition of the system as illustrated in Fig. 5 may be obtained when the tractor is started to move forward after the lever 169 has been moved to its implement lowered position and the harrow has thereby been caused to rest on its disks as explained hereinbefore in connection with Fig. 4. In the condition illustrated by Fig. 5 the tractor develops considerable draw bar pull which causes the hitch lever 29 to swing forwardly from the position in which it is shown in Fig. 4 against the action of the coil spring 32. Such forward swinging of the lever 29 is transmitted to the reach link 37 and as a result the triangular rocker 146 will turn in anticlockwise direction to a limited extent about its pivot pin 148 under the bias to which it is subjected by the control spring 157 which, as explained in connection with Fig. 4, tends to swing the floating lever 156 about its pivot center 163 and acts through the pin and slot connection 159, 161 to swing the second rocker 153 and the triangular rocker 146 in anticlockwise direction about their respective pivot pins 152 and 148.

For purposes of explanation it may be assumed that the forward pull which is required to advance the disk harrow in the lowered position in which it is shown in Fig. 5 exceeds the drawbar pull which the tractor is able to develop under its normal rear wheel load of about 3300 pounds. That is, if the normal downward load on the rear wheels of the tractor is seventy percent of the total tractor weight, as mentioned hereinbefore, application of the full driving torque of the engine to the tractor rear wheels will cause the tractor wheels to slip and consequently the advance movement of the tractor will slow down or possibly stop all together. The system, and particularly the coil spring 32, are so designed that when the hand lever 169 is in its fully lowered position as shown in Fig. 5 and the drawbar load reaches the point where the tractor wheels begin to slip, as explained hereinbefore, the floating lever 156 will assume a position approximately as indicated in Fig. 5, that is, a position in which the contact boss 174 is just about ready to engage the right end of the valve spool 93 while the latter is in the limit position in which it is shown in Figs. 4 and 5. When the operator notices that the tractor slows down due to wheel slippage he may increase the grip of the tractor rear wheels by simply moving the hand lever 169 upward from its implement lowering to an intermediate or weight transfer position such as indicated, for instance, in Fig. 6.

Comparing Fig. 6 with Fig. 5, it will be noted that upward adjustment of the hand lever 169 from its implement lowering position, while the hitch lever 29 is in a forwardly adjusted position and the spring 32 is appreciably loaded due to heavy drawbar pull of the tractor, causes the floating lever 156 to swing to the left in Fig. 6 about the pivot pin 159 on the secondary rocker 153 so as to move the valve spool 93 to an adjusted position, as illustrated in Fig. 6. In this position the port 138 of the internal passage 136 is closed by the land $V_0$ of the valve spool 93 and the land $V_1$ of the valve spool 93 has moved into a position which prevents the oil discharge from pump $P_1$ to pass into the branch 116 of the outlet manifold 117. Not being able to return to sump, the oil discharged from pump $P_1$ unseats the check valve 124 and builds up pressure in the pressure manifold 122. Continued delivery of oil from pump $P_1$ into the pressure manifold 122 unseats the check valve 137 and causes passage of pressure fluid through the conduits 141 and 142 into the rams 21 and 24, and through the conduit 143 into axial bore 234 of the distributor valve spool 202. The plunger 236 in the counterbore of the distributor valve spool is pressed firmly against the adjacent disk head 224 of the thumb screw 222, when fluid pressure builds up in the axial bore 234, and the resulting axial thrust upon the thumb screw 222 is taken up by the threaded sleeve 221 and transmitted to the housing 201 of the distributor valve by the head plate 218 and cap screws 219. Under these conditions, the valve spool 202 becomes subject to an axial thrust which tends to move it toward the end cover 204 when fluid pressure builds up in the internal passage 234 of the valve spool. Such axial thrust is opposed by the coil spring 231 which tends to retain the valve spool in the ram releasing position in which it is shown in Fig. 4, and in which the discharge passage 214 is in open communication with the relief passage 213.

Fig. 6 shows the spool 202 of the distributor valve 200 in a position of axial displacement toward the end cover 204, and the yielding characteristic of the spring 231 is such that a fluid pressure of considerable magnitude is required in the pressure manifold 122, conduits 141, 142, 143, and axial bore 234 in order to effect an axial shift of the valve spool 202 from the position in which it is shown in Figs. 4 and 5 to the position in which it is shown in Fig. 6. Since this pressure also acts upon the rams 21 and 24 and thereby becomes effective to impose a traction boosting additional load upon the tractor rear wheels 2 and 3 by means of the bell crank levers 18, 19 and the chain or cable 92, it will hereinafter be termed the traction boosting line pressure for the system. Under the conditions illustrated by Fig. 6 this line pressure is built up by operation of the pump $P_1$ and is communicated to the rams 21 and 24, but not to the ram 81, the latter being in open communication with the sump 101 through the conduit 87, annular grooves 216, 237, 212 and return passage 241.

As the pressure in the pressure manifold 122 rises, the downward load component which is transmitted to the ground by the disks of the harrow becomes progressively smaller and a correspondingly increasing load becomes effective upon the tractor rear wheels. The downward load which is imposed under these circumstances upon the rearwardly extending arms of the bell crank levers 18 and 19 by the cable or chain 92 is opposed by the weight component of the tractor which acts downwardly upon the front wheels 4 and 6. In order to preserve proper steering response of the tractor the front wheels should remain subject to a substantial load at all times, but in actual practice it has been found that a considerable amount of the normal downward load on the front wheels may be transferred to the rear wheels for traction boosting purposes without adversely affecting the steering response of the front wheels. If the harrow has a total weight of 1900 pounds and the normal front wheel loading of the tractor is about 1400 pounds as has been assumed hereinbefore, it would be entirely practical for traction boosting purposes to transfer as much as 1100 pounds or approximately eighty percent of the harrow weight to the tractor rear wheels by operation of the rams 21 and 24.

The amount of weight which will be automatically transferred from the tractor front wheels to the tractor rear wheels increases and decreases in accordance with any increase or decrease of the traction boosting line pressure, and the distributor valve 200 automatically functions to limit said line pressure to a safe predetermined value. This is accomplished by proper proportioning of the valve 200 and particularly of the spring 231, as will become more fully apparent from the explanations hereinbelow with reference to Fig. 7. Shims 243 are interposed between the flange of thimble 229 and the adjacent end of coil spring 231, and by increasing or decreasing the number of these shims the distributor valve may be adjusted for operation at a higher or lower maximum traction boosting line pressure.

While the system is in the condition as illustrated in Fig. 6, three major downward load components are effective upon the rear wheels of the tractor, namely, first, the normal part of the total tractor weight which, as explained hereinbefore, may approximate seventy percent of the total operating weight of the tractor; second, a substantial portion of the implement weight, as for instance, eighty percent; and third, a portion of the normal front wheel load such as ten percent of the total tractor weight. On the basis of the herein assumed weights, the normal rear wheel load of 3300 pounds on the tractor may thus be increased to as much as 4870 pounds by operation of the rams 21 and 24.

When the tractor is operated to advance the harrow in its cutting position as illustrated by Fig. 6, with the hand lever 169 adjusted as shown to a weight transfer position, the drawbar pull of the tractor may increase or decrease as the harrow encounters various conditions of soil resistance. Should the soil resistance increase, the spring 32 will be further compressed and, as a result, the valve spool 93 will be moved further to the left with the result that the pump $P_2$ and possibly pumps $P_3$ and $P_4$ may start delivering pressure fluid into the pressure manifold 122, to the rams 21, 24 and to the distributor valve 200.

When a condition of excessive draft load is encountered while the hand lever 169 is in the weight transfer or traction boosting position in which it is shown in Fig. 6, the system will respond automatically to reduce the draft load by decreasing the cutting depth of the harrow. This is illustrated by Fig. 7. As distinguished from Fig. 6, Fig. 7 shows the main valve spool 93 in its limit position of axial displacement to the left to which it is moved automatically by anticlockwise movement of the floating lever 156 about the pivot pin 163 under the action of the control spring 156, when the hitch lever 29 swings forward against the yielding resistance of the spring 32 under an excessive draft load. In that event all four pumps $P_1$, $P_2$, $P_3$ and $P_4$ will deliver pressure fluid into the pressure fluid manifold 122, and the traction boosting line pressure which acts upon the rams 21 and 24, and upon the spool 202 of the distributor will quickly attain a sufficiently high value so as to force the valve spool 202 to the limit position in which it is shown in Fig. 7, and which is determined by axial engagement of the thimble 229 with the bottom of the recess 217 of the valve housing 201.

Movement of the distributor valve spool 202 to the limit position in which it is shown in Fig. 7 has a twofold effect in that it first disconnects the conduit 87 of the harrow ram 81 from the relief passage 213 by movement of the annular groove 237 and saw cuts 238 out of communication with the annular groove 212; and in that it then connects the conduit 87 with the inlet passage 211 of the valve housing 201 by movement of the annular groove 237 into communication with the annular groove 209. As a result, the pressure buildup by operation of the pumps $P_1$, $P_2$, $P_3$ and $P_4$ will be admitted to the harrow ram 81, and cause the latter to expand and thereby swing the harrow wheels 49 and 50 downwardly relative to the harrow frame. A lifting force will thus be applied to the harrow frame at the mounting brackets 53 and 54 for the rock shaft 52, and at the same time a further lifting force will be applied to the forward part of the harrow by operation of the tractor mounted rams 21 and 24 and the associated bell crank levers 18, 19 and chain or cable 92. The disks of the harrow move upward with the harrow frame when the latter is lifted by conjoint operation of the rams 21, 24 and 84, and due to such upward movement of the harrow disks the drawbar pull of the and the drawbar pull becomes progressively lighter, the tractor will decrease.

As the cutting depth of the disks gradually decreases spring 32 will expand and swing the hitch lever 29 clockwise on its pivot center 31. Such clockwise movement of the hitch lever 29 will result in progressive axial displacement of the main valve spool 93 toward the right in Fig. 7. Full axial displacement of the valve spool 93 from the position shown in Fig. 7 to the position shown in Fig. 4 will successively cut out the pumps $P_4$, $P_3$, $P_2$ and $P_1$ in the order named, and ultimately open the port 138 which controls communication of the internal valve passage 136 with the sump 101.

Fig. 8 illustrates the condition to which the system will automatically adjust itself when the hand lever 169 is in the traction boosting or weight transfer position of Figs. 6 and 7, and the disks of the harrow are raised by conjoint operation of the rams 21, 24 and 81 in the manner explained hereinbefore with reference to Fig. 7. When, as a result of such upward movement of the harrow disks, the drawbar pull of the tractor has fallen to a value at which no traction boosting is required, the hitch lever 29 is in such a position of clockwise adjustment about its pivot center 31, and the floating lever 156 is in such a position of clockwise adjustment about its pivot center 163, that the pressure spring 113 at the left end of the valve spool 93 causes the latter to cut out all of the pumps and, at least partly, opens the port 138 which is controlled by the land $V_0$. In this condition of the system all of the rams 21, 24 and 81 are able to discharge pressure fluid into the sump and, as a result, the harrow will begin to cut deeper and the drawbar load on the tractor will again begin to rise. The cutting depth of the harrow will continue to increase until the drawbar load becomes heavy enough to establish the condition of the system shown in Fig. 6 and in which the pump $P_1$ operates to impose a traction boosting additional load on the rear wheels of the tractor by operation of the rams 21, 24 while the harrow ram 81 remains inoperative due to the action of the distributor valve 200.

From the foregoing explanations it will be apparent that the system operates automatically to impose a traction boosting additional load on the tractor rear wheels only when needed, and that the tractor rear wheels are automatically relieved of such additional loading when it is no longer required. When the hand lever 169 has been adjusted to a weight transfer position, such as shown for instance in Figs. 6, 7 and 8, and if the lever is then left in that position, the system will operate automatically to transfer more or less weight from the implement to the tractor as required by changing conditions of soil resistance while the cutting depth of the disks remains unchanged or substantially unchanged. The system will also function to automatically decrease the cutting depth of the disks if excessive draft requirements are encountered.

In Fig. 9 the hand lever 169 is adjusted to its extreme upward or implement raising position which places the valve spool 93 in a position of adjustment in which all four pumps $P_1$, $P_2$, $P_3$ and $P_4$ deliver pressure fluid into the pressure manifold 122 while the implement hitch lever 29 is in the same rearwardly inclined position in which it is shown in Fig. 4. Full application of fluid pressure from all pumps to the rams 21, 24 and to the distributor valve 200 quickly builds up to the point where all rams are extended to the limit as illustrated by Fig. 9, and in that condition part of the harrow weight is carried on the harrow supporting wheels, and the remainder is taken up by the chain or cable 92 and by the hitch lever 29. After the rams have been fully extended by operation of the pumps $P_1$ through $P_4$, the check valve 134 is unseated automatically to permit return of excess pump discharge to the sump 101 through the passages 133 and 121. In actual practice provisions may be made to automatically shift the valve spool 93 to the position in which it is shown in Fig. 6 after the rams have been fully extended as shown in Fig. 9, and for a fuller explanation of this particular feature reference may be had to the hereinbefore mentioned U. S. Patent 2,679,199.

The ball or other closure element of the check valve 134 is urged upon its seat by a spring 178, and the ball of the check valve 137 is urged upon its seat by a spring 179 which is so proportioned that the check valve 137 opens at a much lower pressure in the manifold 122 than the check valve 134. The purpose of the check valve 137 is to suppress kickback of pressure from the rams into the pumps, and the spring 179 is relatively weak so as to yield readily when fluid pressure builds up in the manifold 122. The check valve 134, on the other hand, is designed so as to open only at a relatively high pressure, that is, at a pressure higher than that which is required to move the spool 202 of the distributor valve 200 in opposition to the action of the coil spring 231 from its Fig. 4 position to its Fig. 7 position. A representative value of the fluid pressure required to open the check valve 134 would be 3500 pounds per square inch (p. s. i.), and a representative value of the fluid pressure required to move the spool 202 of the distributor valve 200 from its Fig. 4 position to its Fig. 7 position would be 975 p. s. i. The tractor mounted rams 21 and 24 and associated lift connections with the harrow are so proportioned that the critical value of the traction boosting line pressure (975 p. s. i.) at which the distributor valve 200 assumes its Fig. 7 position, will effect the maximum weight transfer from the implement and from the tractor front wheels to the tractor rear wheels, which can be tolerated without jeopardizing proper steering response of the tractor front wheels. In other words, the traction boosting line pressure may rise up to the mentioned critical value, but when it reaches it, the system functions automatically to prevent further rise and consequent loss of steering response of the tractor and possible upward swinging of the tractor front end about the axis of the tractor rear wheels.

The automatic functioning of the system which limits the amount of weight transfer from the tractor front wheels to the tractor rear wheels will readily be apparent from an inspection of Fig. 7. As shown in that figure, the spool 202 of the distributor valve 200 is in a condition of axial adjustment which places the tractor ram 81 into communication with the tractor rams 21 and 24. Under these circumstances, any rise of the traction boosting line pressure beyond the mentioned critical value (975 p. s. i.) would immediately reduce the cutting depth of the harrow and drawbar pull of the tractor, with the result that the system would assume the condition illustrated by Fig. 8 in which all pumps are cut out and all rams communicate with the sump 101.

The system also protects the tractor from swinging upward about the axis of its rear wheels when the hand lever 169 is moved from its implement lowering position (Figs. 4 and 5) or from its traction boosting or weight transfer position (Figs. 6, 7, 8) to the implement raising position shown in Fig. 9. The immediate effect of such implement raising movement of the hand lever 169 is to cut in all pumps and to establish a relatively high pressure in the manifold 122, rams 21, 24, bore 234 of the distributor valve spool 202, and in the harrow ram 81. The magnitude of this high pressure which may be termed the holding line pressure of the system, is determined by the check or unloader valve 134 and by any automatic pressure reducing mechanism which may be associated therewith. For purposes of explanation, the holding line pressure may be assumed to be 1500 pounds per square inch. At that holding line pressure all the rams are fully extended and the harrow is held in transport position. The lift force transmitting mechanism which is operatively interposed between the tractor mounted rams 21 and 24 and the harrow frame, and which comprises the rock shaft 16 with bell crank levers 18, 19 and the chain or cable 92, is so proportioned and arranged that in the condition of the system as shown in Fig. 9, the tractor is not subject to an undesirably high downward load by the cable or chain 92, which would cause loss of proper steering response of the tractor front wheels.

Another feature of the system which should be noted is that the harrow descends gently, and its fall is cushioned, when the hand lever 169 on the steering column of the tractor is moved quickly from its Fig. 9 position to its Fig. 4 position. The immediate effect of such implement lowering movement of the hand lever 169 is to cut out all pumps and to open the port 138 to sump. This will relieve the tractor mounted rams 21, 24 and the axial bore 234 of the distributor valve piston 202 of the relatively high holding line pressure (1500 p. s. i.). The rate of speed at which the harrow descends from its transport position (Fig. 9) to its rest position (Fig. 4) depends primarily on the rate of fluid discharge from the harrow ram 81. The saw cuts 238 in the valve spool 202 and the restrictor 239 in the relief passage 213 are proportioned and arranged so as to afford a suitably controlled oil discharge from the ram 81 and a correspondingly controlled descent of the harrow when the holding line pressure (1500 p. s. i.) declines and falls below the critical value (975 p. s. i.) of the reaction boosting line pressure. Axial movement of the valve spool 202 from the Fig. 9 position toward the Fig. 4 position first establishes restricted communication between the spool groove 237 and the housing groove 212 through the saw cuts 238, and thereafter substantially unrestricted communication between these grooves is established when the valve spool 202 arrives in the limit position in which it is shown in Fig. 4. The orifice of the restrictor 239 is of a size to substantially retard passage of fluid from the harrow ram 81 into the sump under the pressure which is imposed upon the plunger of the ram 81 by the weight of the harrow during the lowering operation.

The thumb screw 222 may be used to disable the distributor valve by locking the plunger 202 in the position of maximum axial displacement toward the end cover 204, in which it is shown in Figs. 7 and 9, and in which the inlet and discharge passages 211, 214 of the distributor valve are in direct communication with each other, and in which the relief passage 213 of the distributor valve is closed. Operating conditions under which it would be desirable to lock out the distributor valve 200 by means of the thumb screw 222 may arise when the pump and valve unit 26 on the tractor is to be used in connection with a relatively light pickup type implement, or for simple hydraulic remote control of a trailing implement without weight transfer and traction boosting.

The main valve mechanism includes a thumb screw 110, as shown in Fig. 3, by means of which the pressure buildup in the pressure manifold 122 may be slowed down if it is desired to prevent the harrow or any other implement from being lifted too rapidly. Adjustment of the thumb screw 110 toward the right in Fig. 3 successively disables the pumps $P_4$, $P_3$, $P_2$ and $P_1$ in the order named, as has been pointed out hereinbefore.

The set screws 57 and 58 on the harrow frame permit preselection of the cutting depth at which it is desired to operate the harrow. It will be noted that in the operative condition of the harrow as shown in Fig. 5, pull of the tractor is transmitted to the harrow along a line which is generally downwardly and rearwardly inclined as indicated by the dashed dotted line 176. The draft force acting along the line 176 has an upwardly directed component and if conditions are such that this component of the draft is balanced by the weight and suction of the harrow the set screws 57 and 58 may be adjusted upwardly so as to leave the harrow supporting wheels in a free floating condition. It is therefore obvious that the set screws 57 and 58 are dispensable for the operativeness of the herein disclosed traction boosting power lift system in connection with a disk harrow, and particularly in connection with an implement such as a plow whose operating depth may be preselected by means of a beaming device comprising an adjusting mechanism such as explained hereinbefore with reference to the crank 71 and screw 67.

The hereinabove explained feature of the system to limit the amount of weight transfer from the tractor front wheels to the tractor rear wheels by operation of the tractor mounted rams 21 and 24, and to protect the tractor from swinging upward about the axis of its rear wheels when the hand lever 169 is moved from its implement lowering position (Figs. 4 and 5) or from its traction boosting or weight transfer position (Figs. 6, 7, 8) to the implement raising position shown in Fig. 9, may be accomplished in various ways other than by means of the distributor valve 200 and associated return connection 241 to sump. Fig. 10 illustrates one such possible modification of the system, and Fig. 11 illustrates another.

According to the modification shown in Fig. 10, the conduit 143, which in Figs. 1 to 9 leads to the distributor valve 200, is connected directly to the implement ram 81, and a coil spring 246 is operatively interposed between the rock shaft 52 and the harrow frame so as to bias the harrow supporting wheels toward an elevated position such as indicated in dash dotted lines in Fig. 10. The spring 246 is anchored at one end by means of a pin 247 on a bracket 248 secured to the harrow frame, and the other end of the spring 246 is anchored by means of a pin 249 on the arm 84 of the rock shaft 52. The pins 247 and 249 are so arranged relative to the rock shaft 52 that the effective line of pull of the spring 246 extends past the rock shaft 52 at a relatively short radial spacing from the axis of the latter when the harrow supporting wheels have been moved to their lowest position by full extension of the ram 81, as shown in full lines in Fig. 10; and so that the effective line of pull of the spring 246 extends past the rock shaft 52 at a relatively large radial spacing from the axis of the latter when the harrow supporting wheels have been moved to their highest position as shown in dash dotted lines in Fig. 10. In other words, the spring 246 is arranged in such relation to the center of up and down swinging movement of the harrow supporting wheels that the effective moment arm of the spring increases upon movement of the harrow wheels about said center from a downwardly to an upwardly adjusted position. In operation, the ram 81 is subject at all times to the traction boosting line pressure, but is prevented by the spring 246 from expanding, as long as the traction boosting line pressure remains below the hereinbefore mentioned critical value (975 p. s. i.) at which proper steering response of the tractor front wheels is assured. If the traction boosting line pressure should rise above the critical value, the spring 246 will yield, the harrow wheels will swing downward and the harrow will be lifted, with the result that rise of the traction boosting line pressure will cease before the critical value (975 p. s. i.) has been appreciably exceeded. If the holding line pressure (1500 p. s. i.) is applied to the ram 81 in Fig. 10 upon movement of the hand lever 169 to its implement raising position (Fig. 9), the ram will expand fully and the harrow will be sustained in transport position without loss of proper steering response of the tractor front wheels.

According to the modification shown in Fig. 11, the distributor valve 200 is replaced by a simple differential pressure valve 250 which has a chamber 251 to which traction boosting and holding line pressures are admitted through the conduit 143. Emission of pressure fluid from the chamber 251 into the ram conduit 87 and ram 81 is controlled by a check valve 252 which is preloaded by a spring 253 and thumb screw 254. Discharge of pressure fluid from the ram 81 into the chamber 251 is controlled by check valve 256 the ball of which is pressed upon its seat by a spring 257.

The differential valve 250 is adjusted by the thumb screw 254 to a condition in which considerable pressure may build up in the chamber 251 without passing into the ram line 87 and ram 81. The adjustment of the thumb screw 254 is such that the ball of the check valve 252 becomes unseated when the pressure in the chamber 251 reaches the critical value (975 p. s. i.) of the traction boosting line pressure. In that event pressure fluid passes into the ram 81, and causes the latter to expand, with the result that the harrow will be lifted and further rise of the traction boosting line pressure will be prevented. The spring 257 of the check valve 256 is relatively weak so that pressure fluid may pass from the ram 81 into the chamber 251 whenever the traction boosting line pressure drops below the implement ram pressure.

In general terms, the rams 21 and 24 represent a first servomotor, the ram 81 represents a second servomotor, and actuating means for these servomotors include a control mechanism, as represented by the valve of the pump and valve unit 26 and its associated operating linkage 29, 37, 146, 153, 156, 162, 166, 173 and 169, which is responsive to variations of draft force transmitted from the tractor to a draft load imposing structure, as represented by the harrow, so as to increase and decrease the lifting force exerted upon the latter by operation of the first servomotor, in accordance with increases and decreases, respectively, of said draft force. The herein disclosed traction boosting power lift system further incorporates means operatively associated with the second servomotor for delaying downward movement of the up and down movable running gear element of the draft load imposing structure, as represented by the harrow wheels 49, 50, by operation of the second servomotor until a lifting force in excess of a predetermined value has been applied to the draft load imposing structure by operation of the tractor mounted srevomotor. In the embodiment of the invention as illustrated by Figs. 1 through 9, such delaying means are represented by the distributor valve 200. In the embodiment of the invention as illustrated by Fig. 10 the delaying means are represented by the spring 246; and in the embodiment of the invention as illustrated by Fig. 11 the delaying means are represented by the differential pressure valve 250.

It should be understood that it is not intended to limit the invention to the herein disclosed forms and details of construction and that the invention includes such other forms and modifications as are embraced by the scope of the appended claims.

It is claimed and desired to secure by Letters Patent:

1. In combination with a tractor and an attached draft load imposing structure, a traction boosting power lift system comprising a tractor mounted servomotor operatively connected in lift force transmitting relation with said draft load imposing structure so that transmission of lifting force from said tractor to said attached structure by operation of said servomotor will cause transfer of weight from said structure and from steerable front wheels to drive wheels of said tractor mounted rearwardly of said front wheels; a second servomotor mounted on said draft load imposing structure and operatively connected in downward thrust transmitting relation with an up and down movable ground engaging running gear element of said attached structure, actuating means for said servomotors including a control mechanism responsive to variations of draft force transmitted from said tractor to said draft load imposing structure, so as to increase and decrease said lifting force in accordance with increases and decreases, respectively, of said draft force; and means operatively associated with said second servomotor for delaying downward movement of said running gear element by operation of said second servomotor until a lifting force in excess of a predetermined value has been applied to said draft load imposing structure by operation of said tractor mounted servomotor.

2. In combination with a tractor and attached draft load imposing structure, a traction boosting power lift system as set forth in claim 1, and wherein said means for delaying downward movement of said running gear element of said attached structure comprises a resilient element operatively associated with said running gear element so as to yieldingly urge the latter toward an upwardly adjusted position.

3. In combination, a tractor, an attached draft load imposing structure, and a traction boosting power lift system as set forth in claim 1 and comprising an up and down swingable support for said running gear element having a pivot center on said draft load imposing structure, and spring means for biasing said swingable support upwardly, said spring means being arranged in such relation to said pivot center that the effective moment arm of said spring means increases upon swinging movement of said support about said pivot center from a downwardly to an upwardly adjusted position.

4. In combination with a tractor and an attached draft load imposing structure, a hydraulically operated traction boosting power lift system comprising a tractor mounted first fluid motor connected in lift force transmitting relation with said draft load imposing structure so that transmission of lifting force from said tractor to said attached structure by operation of said first fluid motor will cause transfer of weight from said structure and from a steerable front support of said tractor to drive wheels of the latter mounted rearwardly of said front support; a second fluid motor mounted on said draft load imposing structure and operatively connected in downward thrust transmitting relation with an up and down movable ground engaging running gear element of said attached structure; a pressure manifold connected in fluid delivering relation with said tractor mounted fluid motor; a pressure responsive valve connected in fluid receiving relation with said manifold and in fluid delivering relation with said second fluid motor; and pressure fluid supply means including a control mechanism responsive to variations of draft force transmitted from said tractor to said attached structure so as to place said manifold, first fluid motor and valve under a fluid pressure which increases and decreases in accordance with increases and decreases, respectively, of said draft force; said pressure responsive valve being operative to connect said second fluid motor in fluid receiving relation with said manifold upon rise of said fluid pressure in the latter to a predetermined value, and so as to prevent emission of pressure fluid from said manifold into said second fluid motor as long as said fluid pressure in the latter is below said predetermined value.

5. In combination, a tractor, an attached draft load imposing structure, and a traction boosting power lift system as set forth in claim 4 and further comprising an unloader valve connected in fluid receiving relation with said manifold and operative to connect the latter in fluid delivering relation with a sump upon rise of said fluid pressure in said manifold to a value substantially higher than said predetermined value.

6. In combination, a tractor, an attached draft load imposing structure, and a traction boosting power lift system as set forth in claim 4 including a pressure responsive valve having a pressure chamber connected in fluid receiving relation with said manifold, means connecting said pressure chamber in fluid delivering relation with said second fluid motor including a check valve operative to admit fluid at said predetermined value from said chamber to said second fluid motor and to prevent return flow of fluid from said second fluid motor into said chamber; and another check valve operative to admit fluid below said predetermined value from said second fluid motor into said chamber.

7. In combination with a tractor and an attached draft load imposing structure, a hydraulically operated traction boosting power lift system comprising a tractor mounted first fluid motor connected in lift force transmitting relation with said draft load imposing structure so that transmission of lifting force from said tractor to said attached structure by operation of said first fluid motor will cause transfer of weight from said structure and from a steerable front support of said tractor to drive wheels of the latter mounted rearwardly of said front support; a second fluid motor mounted on said draft load imposing structure and operatively connected in downward thrust transmitting relation with an up and down movable ground engaging running gear element of said attached structure; a pressure manifold connected in fluid delivering relation with said tractor mounted fluid motor; a distributor valve having an inlet passage connected in fluid receiving relation with said manifold, a discharge passage connected in fluid delivering relation with said second fluid motor, and a relief passage connected in fluid delivering relation with a sump; and pressure fluid supply means including a control mechanism responsive to variations of draft force transmitted from said tractor to said attached structure so as to place said manifold, first fluid motor and inlet passage of said distributor valve under a fluid pressure which increases and decreases in accordance with increases and decreases, respectively, of said draft force; said distributor valve being operative to connect said second fluid motor in fluid receiving relation with said manifold and to close said relief passage upon rise of said fluid pressure in said manifold to a predetermined value, and so as to prevent emission of pressure fluid from said manifold into said second fluid motor and sump as long as said fluid pressure in said manifold is below said predetermined value.

8. In combination with a tractor and an attached draft load imposing structure, a hydraulically operated traction boosting power lift system comprising a tractor mounted first fluid motor connected in lift force transmitting relation with said draft load imposing structure so that transmission of lifting force from said tractor to said attached structure by operation of said first fluid motor will cause transfer of weight from said structure and from a steerable front support of said tractor to drive wheels of the latter mounted rearwardly of said front support; a second fluid motor mounted on said draft load imposing structure and operatively connected in downward thrust transmitting relation with an up and down movable ground engaging running gear element of said attached structure; a pressure manifold connected in fluid delivering relation with said tractor mounted fluid motor; a distributor valve having an inlet passage connected with said manifold, a discharge passage connected with said second fluid motor, a relief passage connected with a sump, a movable valve body, and resilient means biasing said valve body into a releasing position in which said valve body is effective to disconnect said inlet passage from said discharge and relief passages and to connect said discharge and relief passages with each other; and pressure fluid supply means including a control mechanism responsive to variations of draft force transmitted from said tractor to said attached structure so as to place said manifold, first fluid motor and inlet passage of said distributor valve under a fluid pressure which increases and decreases in accordance with increases and decreases, respectively, of said draft force; said valve body of said distributor valve being movable by said fluid pressure in opposition to said resilient means so that upon rise of said fluid pressure to a predetermined value, said valve body will be adjusted from said releasing position to an actuating position in which it is effective to disconnect said discharge passage from said relief passage and to connect said inlet passage with said discharge passage.

9. In combination with a tractor and an attached draft load imposing structure, a traction boosting system as set forth in claim 8 and further comprising adjusting means operatively associated with said resilient means for varying the load exerted by the latter upon said movable valve body.

10. In combination with a tractor and an attached draft load imposing structure, a traction boosting system as set forth in claim 8 and further comprising an adjusting mechanism cooperable with said movable body of said distributor valve so as to releasably secure the latter against movement from said releasing toward said actuating position.

References Cited in the file of this patent

UNITED STATES PATENTS

| | | |
|---|---|---|
| Re. 24,006 | Acton | May 24, 1955 |
| 2,638,045 | Heitshu | May 12, 1953 |
| 2,672,802 | Bunting | Mar. 23, 1954 |
| 2,679,199 | Strehlow | May 25, 1954 |
| 2,715,864 | Kopp | Aug. 23, 1955 |
| 2,722,804 | Stickney | Nov. 8, 1955 |